United States Patent [19]
Karg et al.

[11] Patent Number: 6,085,773
[45] Date of Patent: Jul. 11, 2000

[54] AUTOMATIC FLUID SWITCHING VALVE

[76] Inventors: Jeffrey A. Karg, 2 Whitehall La., Hopkinton, Mass. 01748; Michael J. Jobin, 521 Columbus Ave., #6, Boston, Mass. 02118

[21] Appl. No.: 09/205,016

[22] Filed: Dec. 4, 1998

Related U.S. Application Data

[60] Provisional application No. 60/067,662, Dec. 5, 1997.
[51] Int. Cl.[7] .................................................. F16K 11/00
[52] U.S. Cl. ........................................ 137/102; 137/512.4
[58] Field of Search ................................. 137/102, 512.4

[56] References Cited

U.S. PATENT DOCUMENTS

| | | | |
|---|---|---|---|
| 4,084,606 | 4/1978 | Mittleman | 137/102 |
| 4,457,330 | 7/1984 | Fields | 137/102 |
| 5,305,777 | 4/1994 | Nakamura et al. | 137/102 |

OTHER PUBLICATIONS

Merit Medical OEM Sales Group, OEM Products Catalog, Merit Medical Systems, Inc., Published Mar. 17, 1998, 25 pp., (Check Relief Valves, p. 20).

*Primary Examiner*—Stephen M. Hepperle
*Attorney, Agent, or Firm*—Marshall, O'Toole, Gerstein, Murray & Borun

[57] ABSTRACT

An automatic fluid switching valve is disclosed. The switching valve includes first, second and third ports and a valve member controlling fluid flow between the ports. The valve member substantially prevents fluid from flowing: (a) from the third port to the first port; (b) from the second port to the first port; (c) from the third port to the second port; and (d) directly from the first port to the third port. The valve member has a first state in which it permits fluid to flow from the first port to the second port and a second state in which it permits fluid to flow from the second port to the third port.

20 Claims, 2 Drawing Sheets

AUTOMATIC FLUID SWITCHING VALVE

RELATED APPLICATIONS

This application claims priority from prior U.S. provisional application Ser. No. 60/067,662 which was filed on Dec. 5, 1997, and which is hereby incorporated herein in its entirety by reference.

FIELD OF THE INVENTION

The invention relates generally to valves, and, more particularly, to an automatic fluid switching valve

BACKGROUND OF THE INVENTION

Prior art valves for controlling fluid flow through a housing are known in the art. However, such prior art valves have suffered from certain disadvantages. For example, prior art valves often include a handle or other mechanical actuator which physically contacts the internal valve member in some fashion to adjust its position. This circumstance is disadvantageous in that it restricts the valve to a particular mode of operation (e.g., if the position of the valve member is adjusted by rotating a knob, that valve can only be actuated by rotating the knob). It is also disadvantageous in that it introduces additional moving elements into the device which require maintenance and are prone to failure.

In addition, prior art valves are typically position sensitive. In other words, many prior art valves will only function properly if they are oriented in a predefined position. For example, prior art valves employing a ball and a seal as their valving elements fall into this category of position sensitive valves. If oriented incorrectly, gravity will prevent the ball from seating against the seal thereby preventing the valve from operating properly.

SUMMARY OF THE INVENTION

In accordance with an aspect of the invention, a fluid valve is provided. The fluid valve comprises a housing defining a chamber; an intake port in communication with the chamber; an output port in communication with the chamber; and a dual function port in communication with the chamber. The valve also includes a valve member disposed within the chamber and having a first sealing surface for selectively substantially preventing fluid flow between the input port and the chamber and a second sealing surface for selectively substantially preventing fluid flow between the chamber and the output port. The valve member includes a locator which extends from the second sealing surface and which is sized to mate with the output port and to remain in sealing engagement with the output port in the presence of back pressure. The valve member is deformable such that applying a negative pressure having a magnitude above a first threshold to the dual function port deforms the valve member to permit fluid flow between the intake port and the dual function port, and such that applying a positive pressure having a magnitude greater than a second threshold to the dual function port deforms the valve member to permit fluid flow between the dual function port and the output port.

In some embodiments, the first sealing surface has a larger surface area than the second sealing surface such that, if a force of equal magnitude is simultaneously applied to the first and second surfaces, the second sealing surface will remain in sealing engagement with the chamber opening associated with the output port.

In some embodiments, the valve member has a generally T-shaped cross-section.

In some embodiments, the locator comprises a cup shaped plug having an annular wall defining a central cavity. In such embodiments, the annular wall forms a pressure seal with an inside wall defining the output port in response to back pressure such that the valve member is resistant to back flow.

In accordance with another aspect of the invention, a fluid valve is disclosed. The fluid valve includes a housing defining a chamber; an intake port in communication with the chamber; an output port in communication with the chamber; a dual function port in communication with the chamber; and a valve member disposed within the chamber. The valve member has a first sealing surface for selectively substantially preventing fluid flow between the input port and the chamber and a second sealing surface for selectively substantially preventing fluid flow between the chamber and the output port. The valve member also has a first state wherein fluid flow through the chamber is substantially prevented, a second state wherein fluid flow is permitted from the intake port to the dual function port, and a third state wherein fluid flow is permitted from the dual function port to the output port. The valve member includes a cup-shaped plug which cooperates with the output port to resist back flow.

In accordance with still another aspect of the invention, a fluid valve is provided. The fluid valve comprises: a housing defining a chamber; a first port in communication with the chamber; a second port in communication with the chamber; a third port in communication with the chamber; and a valve member disposed within the chamber. The valve member substantially prevents: (a) fluid from flowing from the third port to first port, (b) fluid from flowing from the second port to the first port, (c) fluid from flowing from the third port to the second port, and (d) fluid from flowing directly from the first port to the third port.

Preferably, the valve member permits fluid to flow from the first port to the second port in a first state, and permits fluid to flow from the second port to the third port in a second state.

In some embodiments, the valve member has a first sealing surface for selectively substantially preventing fluid flow through the first port and a second sealing surface for selectively substantially preventing fluid flow through the third port. In such embodiments, applying a negative pressure having a magnitude above a first threshold to the second port preferably deforms the first sealing surface to permit fluid flow from the first port to the second port, and applying a positive pressure having a magnitude above a second threshold to the second port preferably deforms the first sealing surface to permit fluid flow from the second port to the third port.

Other features and advantages are inherent in the apparatus claimed and disclosed or will become apparent to those skilled in the art from the following detailed description and its accompanying drawings.

DESCRIPTION OF THE PREFERRED EMBODIMENT

Figure 1:
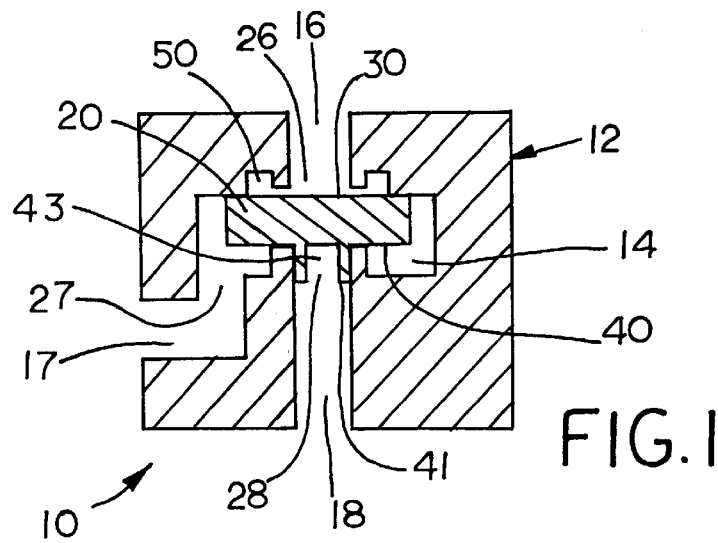
FIG. 1 is a schematic illustration of an automatic fluid switching valve constructed in accordance with the teachings of the instant invention and shown in a neutral state wherein no fluids flow between any two parts.

An automatic fluid switching valve 10 constructed in accordance with the teachings of the invention is schematically illustrated in cross-section in FIG. 1. As used herein the term "fluid" refers to both liquids and gases. Thus, the disclosed valve 10 is adapted for use with both liquids and gases and can be used in any application where flow control is desired.

As shown in FIG. 1, the valve 10 is provided with a housing 12 defining a chamber 14. For the purpose of permitting fluid to controllably flow through the housing 12 and its chamber 14, the housing 12 defines three ports, namely an intake port 16, a dual function port 17, and an output port 18. All three of these ports 16, 17 and 18 are in communication with the chamber 14. In particular, the intake port 16 is in communication with an opening 26 into the chamber 14, the dual function port 17 is in communication with an opening 27 into the chamber 14, and the output port is in communication with an opening 28 into the chamber 14. As shown in FIG. 1, in the illustrated embodiment the openings 27, 28 respectively associated with the dual function port 17 and the output port 18 have approximately the same area. The opening 26 associated with the intake port 16 preferably has a larger area than the other two openings 27, 28.

In order to control the flow of fluid through the housing 12 and, thus, through chamber 14, the valve 10 is provided with a valve member 20 disposed within the chamber 14. As shown in FIG. 1, the valve member 20 preferably has a generally T-shaped cross-section with the top portion 21 of the "T" being disposed adjacent the opening 26 and the bottom 23 of the "T" being disposed within the opening 28. The top portion 21 of the T-shaped valve member 20 forms a sealing surface 30 for selectively substantially preventing fluid flow through the opening 26. The undersurface of the top portion 21 of the valve member 20 forms another sealing surface 40 for selectively substantially preventing fluid flow through the opening 28. As mentioned above, opening 26 is larger than opening 28. Accordingly, the sealing surface 30 adjacent opening 26 is larger than the sealing surface 40 adjacent opening 28. As a result, if a force of equal magnitude is simultaneously applied to the two sealing surfaces 30, 40, the sealing surface 40 adjacent opening 28 will remain in sealing engagement with that opening 28, and, if the magnitude of the force is large enough, the seal between the sealing surface 30 adjacent the opening 26 and the opening 26 will be broken.

Figure 4:
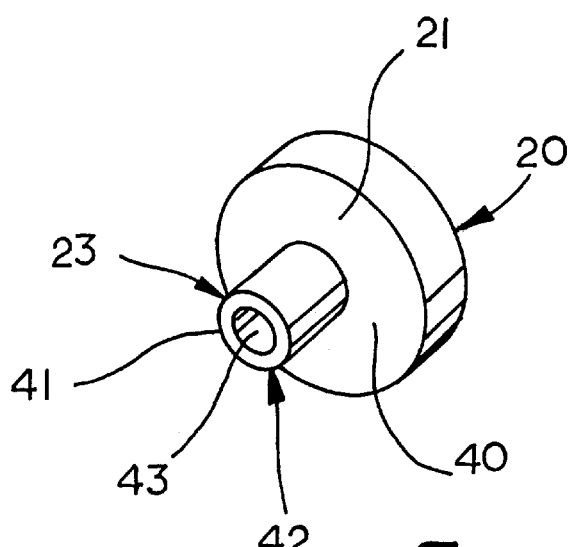
FIG. 4 is a perspective view of the valve member employed in the valve of FIGS. 1–3.

As shown in FIG. 4, the bottom portion 23 of the valve member 20 comprises a locator 42 extending from the sealing surface 40. In the illustrated embodiment, the locator 42, which is preferably centrally disposed with respect to the top portion 21 of the valve member 20, comprises a cup-shaped plug. The plug 42 includes an annular wall 41 defining an open ended central cavity 43. The annular wall 41 has an outside surface which is sized to sit within and slide against the walls of the housing 12 defining the opening 28. The plug 42, thus, serves to locate the valve member 20 within the cavity 14.

Preferably, the valve member 20 and the cavity 14 are sized such that, in the neutral state shown in FIG. 1 wherein fluid cannot flow between any of the ports 16, 17, 18, its sealing surfaces 30, 40 simultaneously form seals with openings 26 and 28, respectively. For the purpose of permitting selective fluid flow through openings 26 and 28, the valve member 20 is deformable. To this end, in the preferred embodiment, the valve member 20 is constructed of an elastomeric material such as silicone which is commercially available from Dow Corning under the tradename Silastic. As explained below, the elastomeric valve member 20 will deform under hydraulic pressure to permit fluid flow through one of the ports 16, 18 while simultaneously precluding fluid flow through the other port 18, 16.

Figure 2:
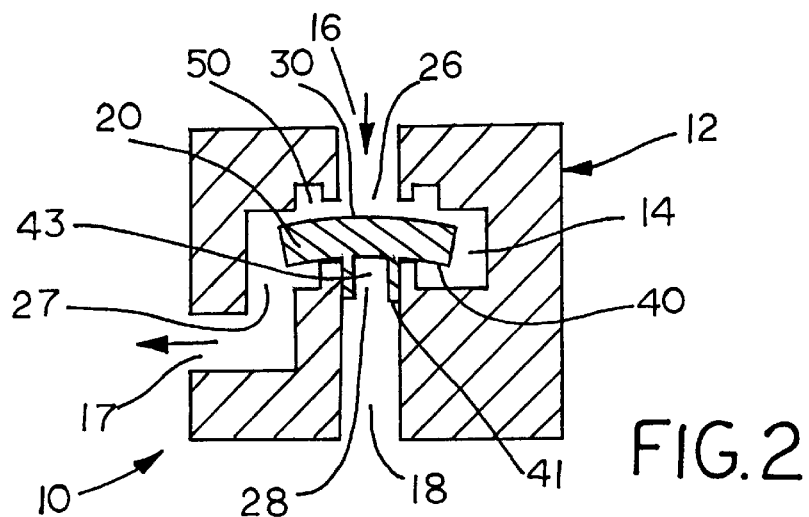
FIG. 2 is a schematic illustration similar to FIG. 1 but showing the valve in a first flow state.

The deformation of the elastomeric valve member 20, and, thus, the flow condition of the valve 10, is controlled via the dual function port 17. In particular, applying a vacuum (i.e., a negative pressure) to the dual function port 17 having a magnitude above a threshold value causes the valve member 20 to deform such that the valve 10 enters the flow state shown in FIG. 2. Specifically, the applied negative pressure has a tendency to bow the top portion of the T-shaped valve member 20 downward such that the sealing surface 30 permits fluid flow through the intake port 16 and the opening 26 into the chamber 14 and out through dual function port 17. In other words, applying a suitable negative pressure to the dual function port 17 deforms the valve member 20 to permit fluid flow from the intake port 16 to the dual function port 17. Although the negative pressure acts upon both the intake port 16 and the output port 18, the difference in area between (a) opening 28 and sealing surface 40, and (b) opening 26 and sealing surface 30 ensures that a greater force is applied to sealing surface 40 than to sealing surface 30 and, thus, that the sealing surface 30 remains in sealing engagement with opening 28.

Figure 3:
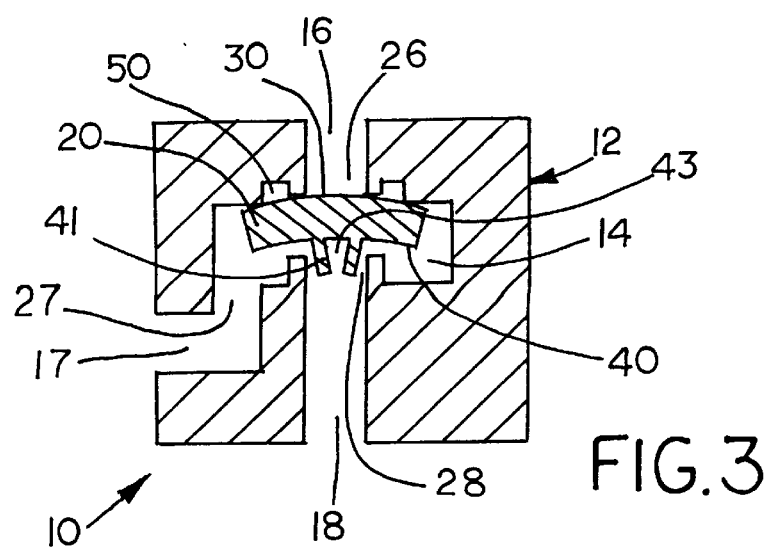
FIG. 3 is a schematic illustration similar to FIGS. 1 and 2 but showing the valve in a second flow state.

On the other hand, applying a positive pressure to the dual function port 17 having a magnitude greater than a threshold value (which may be the same or different from the threshold value discussed above), causes the valve member 20 to deform such that the valve 10 enters the flow state shown in FIG. 3. Specifically, the applied positive pressure creates a pressure difference between the intake port 16 and the dual function port 17 which has a tendency to move the valve member 20 upwards such that the top portion of the T-shaped valve member 20 bows downwards and the sealing surface 40 separates from the opening 28 to permit fluid flow through the dual function port 17 and the opening 27, into the chamber 14 and out through opening 28 and output port 18. In other words, applying a suitable positive pressure to the dual function port 17 deforms and displaces the valve member 20 to permit fluid flow from the dual function port 17 to the output port 18. As shown in FIG. 3, when a suitable positive pressure is applied to the dual function port 17, the annular wall 41 of the cup-shaped plug 42 will preferably deform to facilitate fluid flow through the output port 18.

In order to permit the valve member 20 to be displaced into the opening 26 by the application of a sufficient positive pressure to the dual function port 17, the housing 12 preferably defines a displacement chamber 50 adjacent the opening 26. The displacement chamber 50 is preferably circular in cross-section and is preferably sized to receive a portion of the valve member 20 when the valve 10 enters the flow state shown in FIG. 3. The top portion of the T-shaped valve member 20 is sized to ensure a seal is maintained between the sealing surface 30 and the opening 26 when the valve enters the state shown in FIG. 3.

Although as explained above, the valve 10 is preferably provided with a displacement chamber 50, persons of ordinary skill in the art will appreciate that the chamber 50 can be eliminated without departing from the scope or spirit of the invention.

In addition to acting as a locator, the cup-shaped plug 42 of the valve member 20 also ensures that the valve member 20 is resistant to back flow. Specifically, back flow is prevented by pressure sealing annular wall 41 of plug 42 against the inside wall of port 18. Annular wall 41 must be long enough such that it cannot slip out of engagement with the inside wall of the port 18 when subjected to back pressure.

Persons of ordinary skill in the art will also appreciate that an automatic switching valve which has four no-flow conditions has been provided. Specifically, the valve member 20 prevents: (a) fluid from flowing from the output port 18 to the intake port 16; (b) fluid from flowing from the dual function port 17 to the intake port 16; (c) fluid from flowing from the output port 18 to the dual function port 16; and (d) fluid from flowing directly from the input port 16 to the output port 18. Persons of ordinary skill in the art will also readily appreciate that the valve member 20 has two states. In a first state (see FIG. 2), the valve member 20 permits fluid flow from the intake port 16 to the dual function port 17. In a second state (see FIG. 3), the valve member 20 permits fluid flow from the dual function port 17 to the output port.

Persons of ordinary skill in the art will also appreciate that the disclosed valve is advantageous because, among other things, it can be utilized in any orientation with equal effectiveness. It will also be appreciated that the disclosed valve can employ relatively large ports as compared to prior art valves. As a result, the disclosed valve is advantageous in that it can achieve relatively high flow rates with relatively low pressures. Moreover, persons of ordinary skill in the art will appreciate that the disclosed valve is advantageous in that it controls flow without any physical contact between the valve member 20 and elements external to the housing 12 such as mechanical actuators.

Although certain instantiations of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. A fluid valve comprising:
   a housing defining a chamber;
   an intake port in communication with the chamber;
   an output port in communication with the chamber;
   a dual function port in communication with the chamber; and
   a valve member disposed within the chamber, the valve member having a first sealing surface for selectively substantially preventing fluid flow between the input port and the chamber and a second sealing surface for selectively substantially preventing fluid flow between the chamber and the output port, the valve member further including a locator extending from the second sealing surface, the locator being sized to mate with the output port and to remain in sealing engagement with an inside surface of the output port in the presence of back pressure from the output port, the valve member being deformable such that applying a negative pressure having a magnitude above a first threshold to the dual function port deforms the valve member to permit fluid flow between the intake port and the dual function port, and such that applying a positive pressure having a magnitude greater than a second threshold to the dual function port deforms the valve member to permit fluid flow between the dual function port and the output port.

2. A fluid valve as defined in claim 1 wherein the intake port is in communication with a first opening into the chamber and the output port is in communication with a second opening into the chamber, the first opening being larger than the second opening.

3. A fluid valve as defined in claim 2 wherein the first sealing surface has a larger surface area than the second sealing surface such that, if a force of equal magnitude is simultaneously applied to the first and second surfaces, the second sealing surface will remain in sealing engagement with the second opening.

4. A fluid valve as defined in claim 1 wherein the first and second thresholds are different.

5. A fluid valve as defined in claim 1 wherein the first and second thresholds are identical.

6. A fluid valve as defined in claim 1 wherein the valve member has a generally T-shaped cross-section.

7. A fluid valve as defined in claim 1 wherein the locator comprises a cup-shaped plug having an annular wall defining a central cavity.

8. A fluid valve as defined in claim 7 wherein the annular wall is deformable.

9. A fluid valve as defined in claim 8 wherein the annular wall forms a pressure seal with an inside wall defining the output port in response to back pressure such that the valve member is resistant to back flow.

10. A fluid valve comprising:
    a housing defining a chamber;
    an intake port in communication with the chamber;
    an output port in communication with the chamber;
    a dual function port in communication with the chamber; and
    a valve member disposed within the chamber, the valve member having a first sealing surface for selectively substantially preventing fluid flow between the input port and the chamber and a second sealing surface for selectively substantially preventing fluid flow between the chamber and the output port, the valve member having a first state wherein fluid flow through the chamber is substantially prevented, a second state wherein fluid flow is permitted from the intake port to the dual function port, and a third state wherein fluid flow is permitted from the dual function port to the output port, the valve member including a cup-shaped plug having an outer surface cooperating with an inside surface of the output port to resist back flow from the output port.

11. A fluid valve as defined in claim 10 wherein the intake port is in communication with a first opening into the chamber and the output port is in communication with a second opening into the chamber, the first opening being larger than the second opening.

12. A fluid valve as defined in claim 11 wherein the first sealing surface has a larger surface area than the second sealing surface such that, if a force of equal magnitude is simultaneously applied to the first and second surfaces, the second sealing surface will remain in sealing engagement with the output port.

13. A fluid valve comprising:
    a housing defining a chamber;
    a first port in communication with the chamber;
    a second port in communication with the chamber;
    a third port in communication with the chamber; and
    a valve member disposed within the chamber, the valve member including a cup-shaped plug having a deformable annular wall defining a central cavity, the annular wall forming a pressure seal with an inside wall defining the third port in response to back pressure such that the valve member is resistant to back flow, the valve member substantially preventing: (a) fluid from flowing from the third port to first port, (b) fluid from flowing from the second port to the first port, (c) fluid from flowing from the third port to the second port, and (d) fluid from flowing directly from the first port to the third port.

14. A fluid valve as defined in claim 13 wherein the valve member permits fluid to flow from the first port to the second port in a first state, and permits fluid to flow from the second port to the third port in a second state.

15. A fluid valve as defined in claim 13 wherein the valve member has a first sealing surface for selectively substantially preventing fluid flow through the first port and a second sealing surface for selectively substantially preventing fluid flow through the third port.

16. A fluid valve as defined in claim 15 wherein the first sealing surface has a larger surface area than the second sealing surface such that, if a force of equal magnitude is simultaneously applied to the first and second sealing surfaces, the second sealing surface will remain in sealing engagement with the third port.

17. A fluid valve as defined in claim 15 wherein the valve member is deformable.

18. A fluid valve as defined in claim 17 wherein applying a negative pressure having a magnitude above a first threshold to the second port deforms the first sealing surface to permit fluid flow from the first port to the second port, and applying a positive pressure having a magnitude above a second threshold to the second port deforms the first sealing surface to permit fluid flow from the second port to the third port.

19. A fluid valve as defined in claim 18 wherein the first and second thresholds are different.

20. A fluid valve as defined in claim 18 wherein the first and second thresholds are identical.

* * * * *